US007849155B2

(12) United States Patent
Ryu et al.

(10) Patent No.: US 7,849,155 B2
(45) Date of Patent: Dec. 7, 2010

(54) APPARATUS AND METHOD OF PROVIDING MULTIMEDIA CONTENT

(75) Inventors: Young-jae Ryu, Yongin-si (KR); Seong-won Jo, Seongnam-si (KR); Ju-hyun Ko, Seoul (KR); Hwa-youn Suh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 831 days.

(21) Appl. No.: 11/601,677

(22) Filed: Nov. 20, 2006

(65) Prior Publication Data

US 2007/0143183 A1 Jun. 21, 2007

(30) Foreign Application Priority Data

Dec. 1, 2005 (KR) .................. 10-2005-0116551

(51) Int. Cl.
*G06F 15/16* (2006.01)
(52) U.S. Cl. .................. 709/217; 709/219; 709/227; 709/237; 705/14
(58) Field of Classification Search ......... 709/213–231; 705/14
See application file for complete search history.

(56) References Cited

U.S. PATENT DOCUMENTS

| 7,370,031 | B2 * | 5/2008 | Kaiser et al. .................. 707/2 |
| 7,457,852 | B2 * | 11/2008 | O'Rourke et al. .......... 709/219 |
| 2002/0019858 | A1 | 2/2002 | Kaiser et al. |
| 2003/0182184 | A1 * | 9/2003 | Strasnick et al. .............. 705/14 |
| 2004/0073924 | A1 * | 4/2004 | Pendakur ..................... 725/46 |
| 2005/0038819 | A1 * | 2/2005 | Hicken et al. ............ 707/104.1 |
| 2005/0080673 | A1 * | 4/2005 | Picker et al. .................. 705/14 |
| 2005/0198317 | A1 * | 9/2005 | Byers ......................... 709/228 |
| 2005/0228830 | A1 * | 10/2005 | Plastina et al. ............ 707/104.1 |
| 2006/0095396 | A1 * | 5/2006 | Ostrover ....................... 707/1 |
| 2007/0288447 | A1 * | 12/2007 | Andris et al. .................. 707/5 |

FOREIGN PATENT DOCUMENTS

| JP | 11-007453 A | 1/1999 |
| JP | 2001-195641 A | 7/2001 |
| JP | 2002-99283 A | 4/2002 |
| JP | 2003-076704 A | 6/2002 |
| JP | 2002-171231 A | 3/2003 |
| JP | 2003-099459 A | 4/2003 |
| JP | 2004-326227 A | 11/2004 |
| KR | 10-2002-0046662 A | 6/2002 |

(Continued)

OTHER PUBLICATIONS

Umeki et al. "Supporting Network Community Formation" Human Interface Laboratory, Corporate R&D Center, Toshiba Corporation, vol. 2000, No. 63, pp. 25-30 and 8-10.

*Primary Examiner*—Wing F Chan
*Assistant Examiner*—Razu A Miah
(74) *Attorney, Agent, or Firm*—Sughrue Mion, PLLC

(57) ABSTRACT

An apparatus and method for providing multimedia contents is provided. The apparatus includes an analyzing unit that analyzes a quantity ratio corresponding to a type of first multimedia content included in an album, a mood code generating unit that generates a mood code corresponding to the quantity ratio as the analyzed result, a content abstracting unit that abstracts a list of second multimedia content corresponding to the generated mood code, and a sending/receiving unit that sends at least one of the list and the second multimedia content included in the list.

20 Claims, 6 Drawing Sheets

FOREIGN PATENT DOCUMENTS

| | | |
|---|---|---|
| KR | 2003-0022842 A | 3/2003 |
| KR | 10-2003-0059503 A | 7/2003 |
| KR | 10-2004-0031791 A | 4/2004 |
| WO | 2004/107757 A1 | 12/2004 |

* cited by examiner

APPARATUS AND METHOD OF PROVIDING MULTIMEDIA CONTENT

CROSS-REFERENCE TO RELATED APPLICATION

This application is based on and claims priority from Korean Patent Application No. 10-2005-0116551 filed on Dec. 1, 2005 in the Korean Intellectual Property Office, the disclosure of which is incorporated herein in its entirety by reference.

BACKGROUND OF THE INVENTION

1. Field of the Invention

Apparatuses and methods consistent with the present invention relate to providing multimedia content and, more particularly, to an apparatus and method for providing multimedia content, which, through a mood code corresponding to a quantity ratio of the type of content input by a user, abstracts similar mood-content registered by a user or lists of the content, and provides it to the user.

2. Description of the Related Art

The development of data compression and network technologies has enabled users to receive multimedia content such as music files over the Internet.

A multimedia content providing system may include a multimedia content providing device and a user terminal. When this is the case, the multimedia content providing device provides multimedia content corresponding to a keyword received by the user terminal or multimedia content recommended by reference to other information.

FIG. 1 is a concept view that shows multimedia content provided using a related art search method.

A multimedia content providing device 11 may have various types of multimedia content; particularly, the multimedia content providing device 11, providing music files, may have music files 15 classified by groups such as title, artist, lyric, release date, and number of downloads.

When a user inputs a keyword to the user terminal 12, the multimedia content providing device 11 receives the input keyword, and then searches for music files corresponding to the keyword. The multimedia content providing device 11 transmits the abstracted music files based on a search result or a list of the music files to the user terminal 12.

Accordingly, a user can receive his/her favorite music files via the user terminal 12.

Also, a user may directly search for music files by connecting to database of the multimedia content providing device 11 via the user terminal.

FIG. 2 is a concept view that shows multimedia content provided by a related recommendation method.

A multimedia content providing device 21 may recommend music files 25 by checking how many times a user has accessed each music file based on the keyword and search message received by the user terminal 22, and checking the renewed multimedia content.

The recommended music files 25 include recommended songs, new songs, and new albums. After connecting to the multimedia content providing device 21 via the user terminal 22, a user may select and receive one or more of the recommended music files 25.

The multimedia content providing device 21 may provide multimedia contents to a user through a search method or a recommendation method.

However, the multimedia content provided by a search may be provided only when a user has information on his/her favorite music files. If a user does not have information on his/her favorite music files, the multimedia content providing device 11 cannot provide music files.

The multimedia content provided using the recommendation method have a drawback in that the same music files are provided to all users regardless of preference. Accordingly, a user may not receive desired music files when using the recommendation type method.

Korean Unexamined Patent 2003-0059503 discloses a custom service method, which stores information on features of music files in database by abstracting features of various music files prepared for an online music service, searches for music files having a feature information value that is very similar to a feature information value of a user's favorite music, which is generated by collecting and analyzing information on features of music files desired by user, and provides the found music files.

However, the Korean Unexamined Patent 2003-0059503 relates to providing a music file corresponding to a feature information value given by a user, which is the same as the method of classifying music files by groups such as title, artist, lyrics, release date, and number of downloads.

SUMMARY OF THE INVENTION

The present invention provides a user interface using a pointing object in order to easily control a portable broadcast receiving device.

According to an aspect of the present invention, there is provided an apparatus for providing multimedia content, the appratus including an analyzing unit that analyzes a quantity ratio by type of first multimedia content included in an album, a mood code generating unit that generates a mood code corresponding to the ratio as the analyzed result, a content abstracting unit that abstracts a list of second multimedia content corresponding to the generated mood code, and a sending/receiving unit that sends at least one of the list and the second multimedia content included in the list.

According to another aspect of the present invention, there is provided a method of providing multimedia content, the method including analyzing a quantity ratio by type of first multimedia content included in an album, generating a mood code corresponding to the ratio as the analyzed result, abstracting a list of second multimedia content corresponding to the generated mood code, and sending at least one of the list and the second multimedia content included in the list.

BRIEF DESCRIPTION OF THE DRAWINGS

The above and other aspects of the present invention will become apparent by describing in detail exemplary embodiments thereof with reference to the attached drawings, in which.

DETAILED DESCRIPTION OF THE EXEMPLARY EMBODIMENTS

Figure 1:
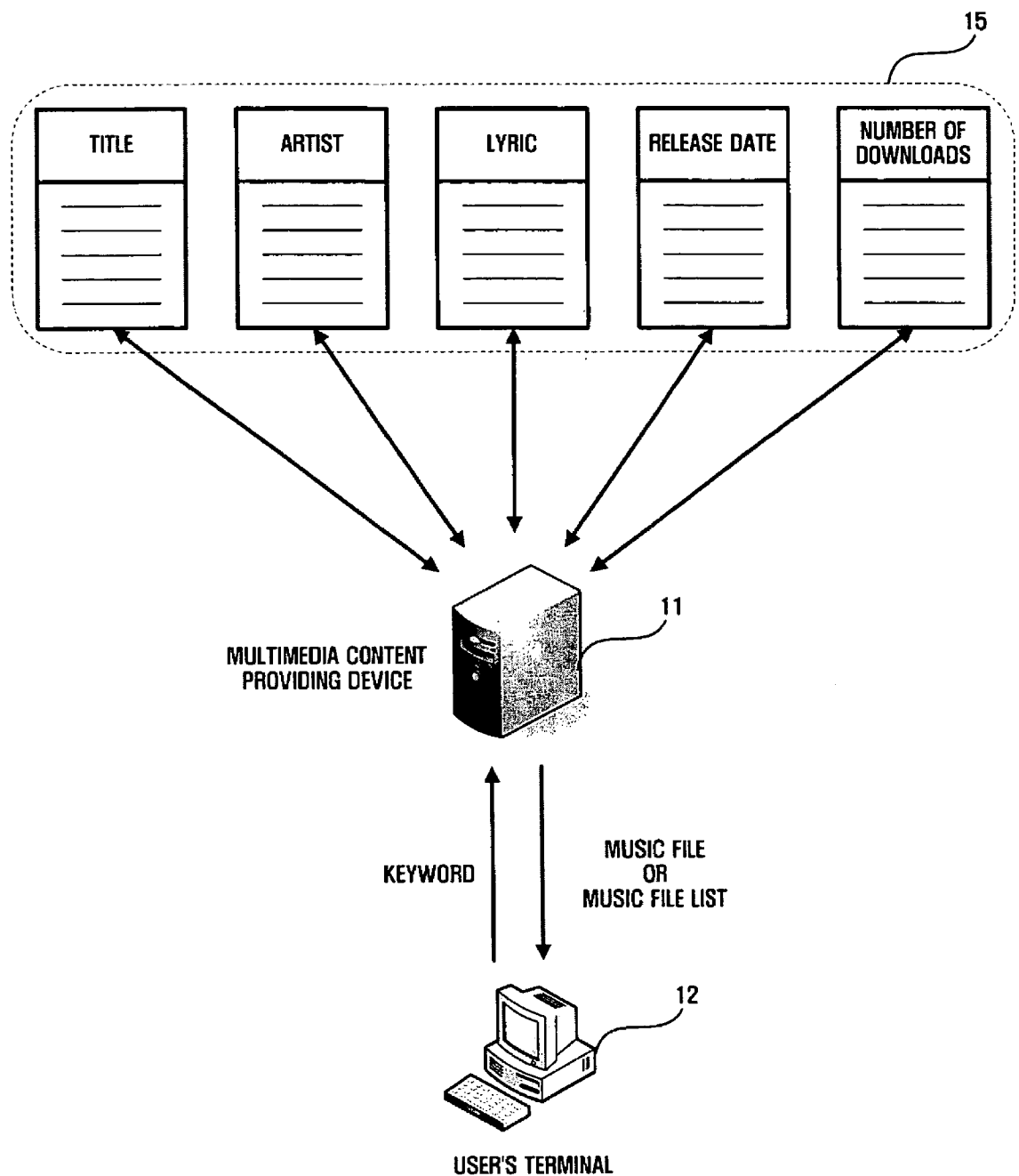
FIG. 1 is a concept view that shows multimedia content provided by a related art search method.
Figure 2:
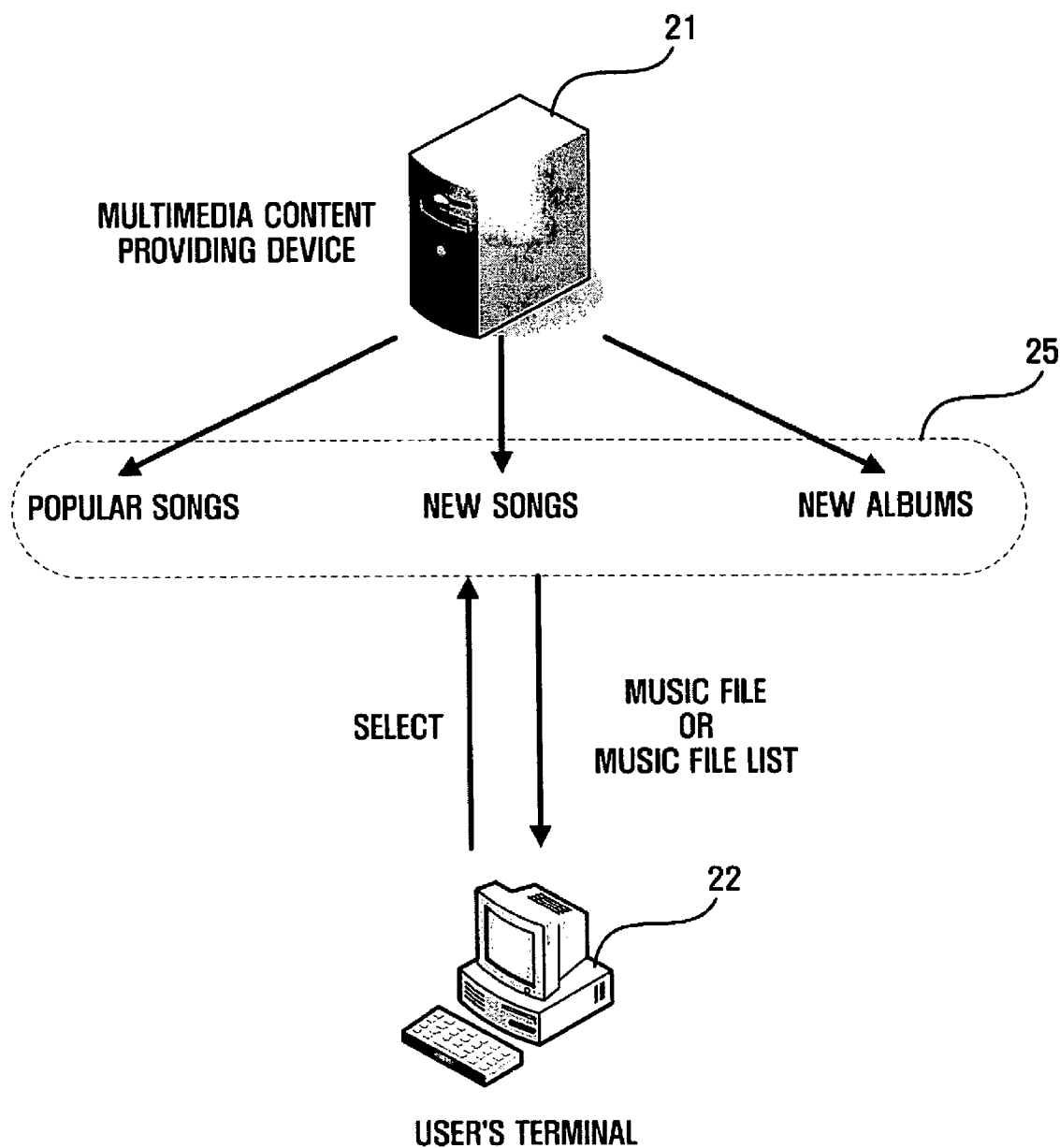
FIG. 2 is a concept view that shows multimedia content provided by a related art recommendation method.

Exemplary embodiments of the present invention will be described in detail with reference to the accompanying drawings.

Various aspects of the present invention and methods of accomplishing the same may be understood more readily by reference to the following detailed description of the exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will be defined by the appended claims. Like reference numerals refer to like elements throughout the specification.

The present invention is described hereinafter with reference to flowchart illustrations of user interfaces, methods, and computer program products according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer readable memory that can direct a computer or other programmable data processing apparatus to function in a particular manner, such that the instructions stored in the computer usable or computer readable memory produce an article of manufacture including instruction means that implement the function specified in the flowchart block or blocks. The computer program instructions may also be loaded into a computer or other programmable data processing apparatus to cause a series of operational steps to be performed in the computer or other programmable apparatus to produce a computer implemented process such that the instructions that execute in the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order, depending upon the functionality involved.

Figure 3:
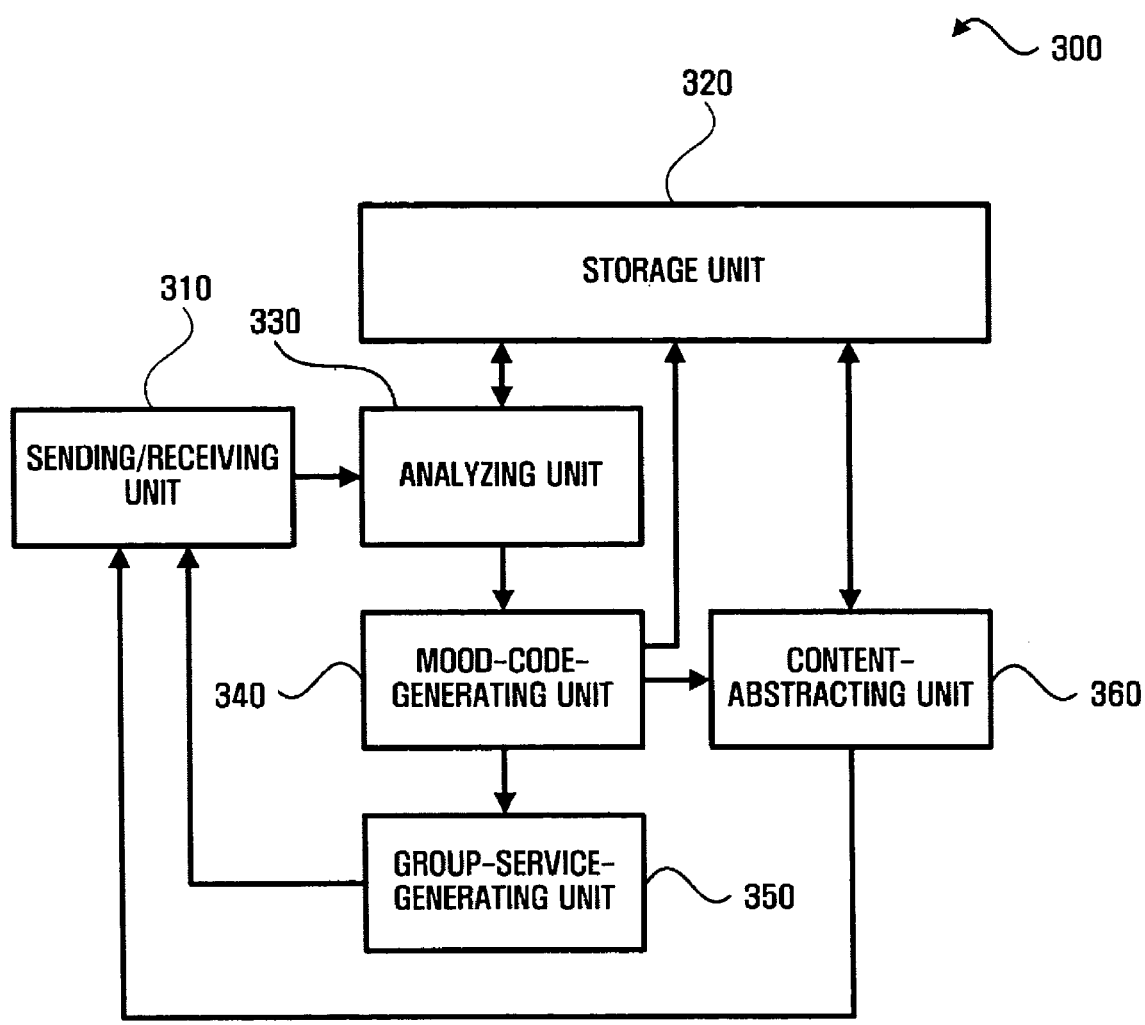
FIG. 3 is a block diagram showing an apparatus for providing multimedia contents according to an exemplary embodiment of the present invention.

FIG. 3 is a block diagram showing an apparatus for providing multimedia content according to an exemplary embodiment of the present invention. An apparatus for providing multimedia content (hereinafter, referred as to a content providing device) 300 includes a sending/receiving unit 310, a storage unit 320, an analyzing unit 330, a mood code generating unit 340, a content abstracting unit 360, and a group service generating unit 350.

The storage unit 320 stores a content list registered by a user who wants to register the content list (hereinafter referred to as a registering user). Content included in the content list may include audio, still images, moving images, and the like.

The registering user may register a series of favorite content lists; hereinafter, a series of content lists is referred to as an album. That is, the registering user may register a group of desired content lists as a single album, and may also register another album.

Accordingly, a single album may include a list of one or more sets of content.

A single album may include a list of various types of content. Here, the type may be classified as multimedia or the nature of the content, but other types of classification may be used.

For example, an album, including various sets of content classified as multimedia, may include audio, still images, moving images. An album, including various sets of content classified by the nature of the content, may include various audio, still images, or genres of moving images.

The audio content may be classified in another manner in addition to rhythm. For example, audio content, which is classified by genre, age group, time, mood, weather, situation, title, artist, and lyrics, may be included in a single album.

The storage unit 320 may store an album based on a mood code based on a quantity ratio by type of content included in an album. If content included in an album is audio content, and their genre includes blues, jazz, classical and popular songs, the storage unit 320 may store the album based on a mood code, which is generated according to a ratio of each genre to the entire audio content.

The storage unit 320 may store a registering user's identification (ID) based on a mood code. If content included in a specific registering user's album is audio content, and the genre includes blues, jazz, classical and popular songs, the storage unit 320 may store a registering user's ID based on a mood code, which is generated according to a quantity ratio of each genre to the entire audio content.

The mood code is an album including content at a specific quantity ratio by type or identifying information given to a registering user. Mood codes of albums registered by different registering users may be the same if their type and ratio are the same as each other even though the quantity of content included in each album is different.

Hereinafter, audio content will be described, but this is merely exemplary. Still image content, moving picture content, and other types of content may be included without departing from the spirit and scope of the invention The number of types may be different and varied according to how the content providing device 300 is embodied, and may be set by a registering user.

The storage unit 320 may store the content included in the content list. A user who wants to use the contents by searching for an album (hereinafter, referred to as a searching user) may access corresponding content via the retrieved content list.

The storage unit 320 may be built in the apparatus as a module able to input/output information, such as a hard disk, a flash memory, a compact flash (CF) card, a secure digital (SD) card, a smart media (SM) card, a multimedia card (MMC), or memory stick, or may be included in an additional device.

The analyzing unit 330 analyzes a quantity ratio by the type of content input by a searching user. A terminal of the searching user may transmit a content list to the content providing device 300 by searching for content stored in the terminal, and may transmit the content list to the content providing device 300 by directly receiving it from the searching user.

A searching user may also store a content list in the storage unit 320 by registering his/her favorite content list as a registering user in advance. The analyzing unit 330 may analyze a quantity ratio by type of content by using the stored searching user's content list.

The type in this exemplary embodiment includes at least one of genre, age group, time, feeling, weather, situation, title, artist, and lyrics. The analyzing unit 330 may analyze a ratio based on several types of content included in a single content list.

For example, the analyzing unit 330 may analyze a quantity ratio of content by age group as well as a quantity ratio of content by genre. Therefore, it is possible to analyze the details of the content.

The analyzing unit 330 may analyze, by type, the quantity ratio of content included in a registering user's content list stored in the storage unit 320. When a content list is registered by a registering user, the analyzing unit 330 may analyze the registering user's content list. When a searching user searches for content, the analyzing unit 330 may analyze the registering user's content list.

The mood code generating unit 340 generates a mood code corresponding to the ratio calculated according to analyzed result of the analyzing unit 330.

As described above, the analyzing unit 330 may analyze a quantity ratio of one or more types of content; whereby, the mood code generating unit 340 may generate each mood code corresponding to a quantity ratio of one type of content and, additionally, several types of content, and then may generate a single mood code integrating each mood code.

The mood code generating unit 340 generates a mood code as a result of the analyzing unit 330; whereby, the mood code generating unit 340 generates a mood code for a registering user's content list as well as a searching user's content list. The storage unit 320 stores the registering user's ID or album based on the generated mood code. The corresponding content list may be stored in the storage unit 320 by logically connecting to the registering user's ID or album.

The mood code will be described in detail with reference to FIGS. 3 and 4.

The content abstracting unit 360 abstracts a content list corresponding to the generated mood code from the storage unit 320. The storage unit 320 stores a registering user's ID or album based on the mood code. The content abstracting unit 360, after searching for a registering user's mood code that is similar to a searching user's mood code received from the mood code generating unit 340, abstracts a registering user's content list stored based on the retrieved mood code, or after searching for a registering user's album mood code similar to a searching user's mood code, abstracts a content list included in the stored album based on the retrieved mood code.

After calculating the similarity between a searching user's mood code and a registering user's mood code, or between the registering user's album mood codes, the content abstracting unit 360 may abstract the corresponding content list only when the similarity is in a critical range or threshold determined by a searching user.

The sending/receiving unit 310 sends at least one of a content list abstracted by the content abstracting unit 360 and the contents included in the content list to the searching user's terminal.

The sending/receiving unit 310 receives a content list required to be registered from a registering user, receives a content list required to be registered from a searching user, and sends a web service or web services to a user having a similar mood code.

A communication method used between the sending/receiving unit 310 and a registering user's terminal or between searching user's terminals may be a wired communication method such as Ethernet, universal serial bus (USB), IEEE 1394, serial communication, and parallel communication, or a wireless communication method such as infrared communication, Bluetooth, home radio frequency (RF), and wireless local area network (LAN).

The group service generating unit 350 creates a group that consists of similar mood codes, of mood codes generated by the mood code generating unit 340, and generates a web service or web services for the group.

The web services may include online chatting and multimedia content sharing. That is, a searching user may chat with a registering user having an album of a mood code similar to the searching user's album or mood code, or exchanges content with the registering user. However, the web services generated may include other types of web services without departing from the spirit and scope of the present invention.

The sending/receiving unit 310 sends the generated web service to searching and registering users having mood codes included in the group. The searching and registering users may receive the web service via the content providing device 300 and point to point devices (P2P), or the like.

Figure 4:
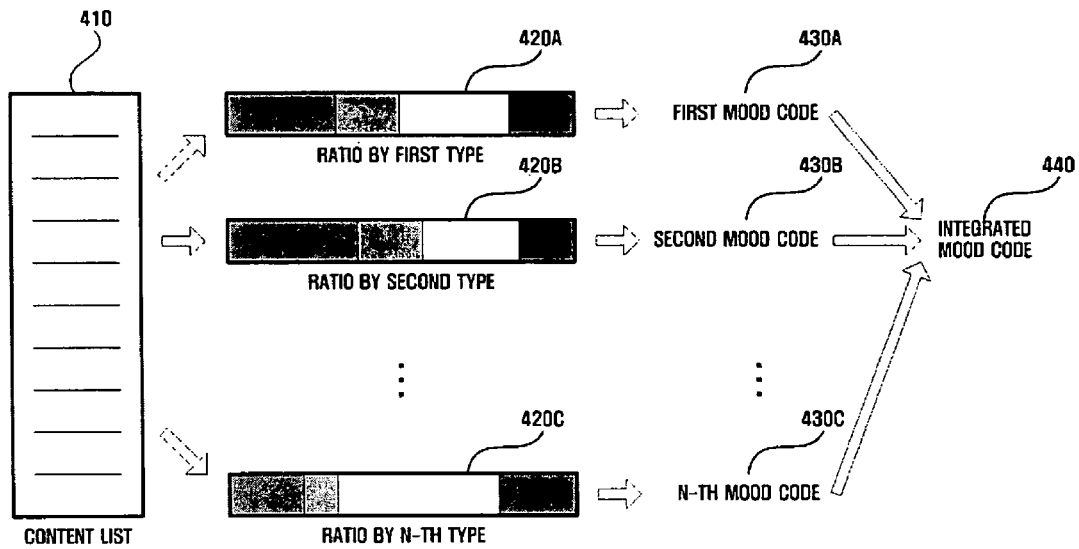
FIG. 4 illustrates a mood code according to an exemplary embodiment of the present invention.

FIG. 4 illustrates a mood code according to an exemplary embodiment of the present invention.

As described above, the analyzing unit 330 may analyze a quantity ratio by type of input content. Here, the content refers to content input by searching and registering users.

The analyzing unit 330 analyzes a quantity ratio of content based on a type or types set in advance. The ratios 420A, 420B, and 420C may be different according to the set type. For example, if a series of content lists 410 exist, a quantity ratio of content having genre classified as blues, jazz, classical and popular songs may be 30%, 20%, 10%, and 40%. A quantity ratio of the same content classified by age groups consisting of 10's, 20's, 30's, and 40's may be 20%, 40%, 30%, and 10%.

That is, the ratios and mood codes 430A, 430B, and 430C may be different according to the types of content set. The analyzing unit 330 may analyze a quantity ratio of various types of content 420A, 420B, and 420C as well as a quantity ratio one type of content.

The analyzed result is transmitted to the mood code generating unit 340. The mood code generating unit 340 generates mood code corresponding to the transmitted ratio. That is, the mood code generating unit 340 generates mood codes 430A, 430B, and 430C.

The mood code generating unit 340 integrates the generated mood codes 430A, 430B, and 430C as a single mood code 440 that will be a mood code for a registering user or a registering user's album.

The searching or registering users may select the type, which is analyzed by the analyzing unit 330. The registering user may set a type while registering his/her favorite content list 410. The analyzing unit 330 analyzes the ratios 420A, 420B, and 420C set by a searching user. The mood code generating unit 340 generates the integrating mood code 440 according to the analyzed result.

The type set by a searching user and the type set by a registering user may be different. A mood code generated according to the type set by the user for a content list registered by a registering user may be compared with a searching user's mood code. It is possible to compare a mood code corresponding to types set by the searching user and a mood code corresponding to types set by registering user.

The format of the mood codes 430A, 430B, and 430C, and the format of the integrated mood code 440 may be different according to how the mood code generating unit 340 is embodied; the formats may be identical or different.

For example, the format of the mood codes 430A, 430 B, and 430C may be English letters A to Z. If the format of the mood codes 430A, 430 B, and 430C, and the format of the integrated mood code 440 are different, where mood codes 430A, 430 B, and 430C based on four types: B, A, H, and Q,; the integrated mood code may be represented by BAHQ.

If the format of the mood codes 430A, 430 B, and 430C, and the format of the integrated mood code 440 are identical, where 430A, 430 B, and 430C are types B, A, H, and Q, the mood code generating unit may generate the integrated mood code as D, i.e., a single mood code 440 integrating the mood codes B, A, H, and Q.

Since the type, which is analyzed by the analyzing unit 330, may be applied differently by a user, and the number of types may also be applied differently, the format of 430A, 430 B, and 430C, and the format of the integrated mood code 440 may be identical. In this respect, mood codes may be compared with no regard to types or the number of types.

Figure 5A:
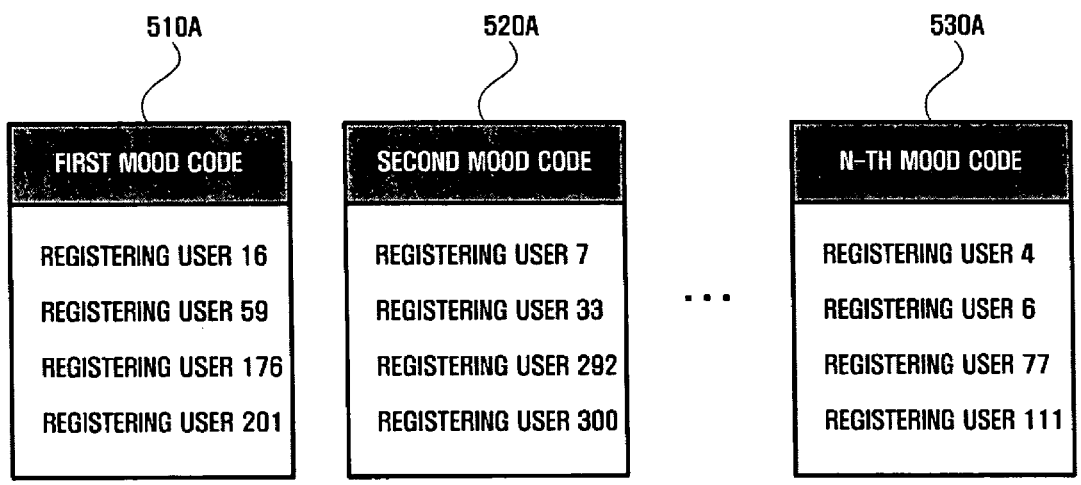
FIG. 5A shows a registering user's list stored based on a mood code according to an exemplary embodiment of the present invention.

FIG. 5A shows a registering user's list stored based on a mood code according to an exemplary embodiment of the present invention.

The storage unit 320 of the content providing device 300 may store a registering user's ID according to a mood code. That is, after forming a single group that consists of several registering users having a similar mood code, the storage unit 320 stores each registering user's ID based on mood codes 510A, 520A, and 530A.

The content abstracting unit 360 abstracts a registering user's content list stored based on a mood code, which is similar to a searching user's mood code, of mood codes stored in the storage unit 320

The group service generating unit 350 generates a group service for users having a similar mood code. The group service may be transmitted to a searching user having a similar mood code.

Figure 5B:
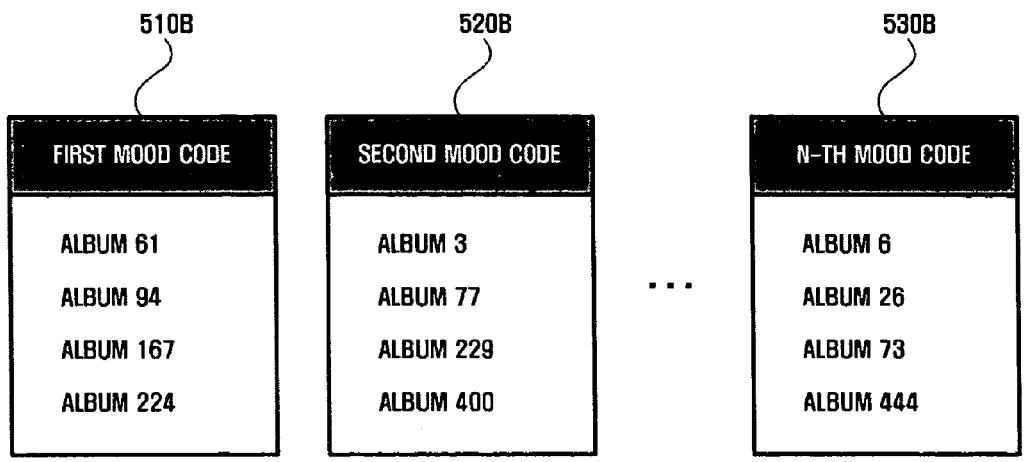
FIG. 5B shows an album list stored based on a mood code according to an exemplary embodiment of the present invention.

FIG. 5B shows an album list stored based on a mood code according to an exemplary embodiment of the present invention.

The storage unit 320 of the content providing device 300 may store a registering user's album according to a mood code. That is, after forming a single group that consists of registering user's albums having a similar mood code, the storage unit 320 stores albums based on the mood codes 510B, 520B, and 530B.

The content abstracting unit 360 abstracts a content list included in registering user's albums stored in the mood codes 510B, 520B, and 530B, which is similar to a searching user's mood code of mood codes stored in the storage unit 320.

The searching user, who receives the content list included in the mood codes 510B, 520B, and 530B, may receive a group service generated for users having the corresponding mood code.

Figure 6:
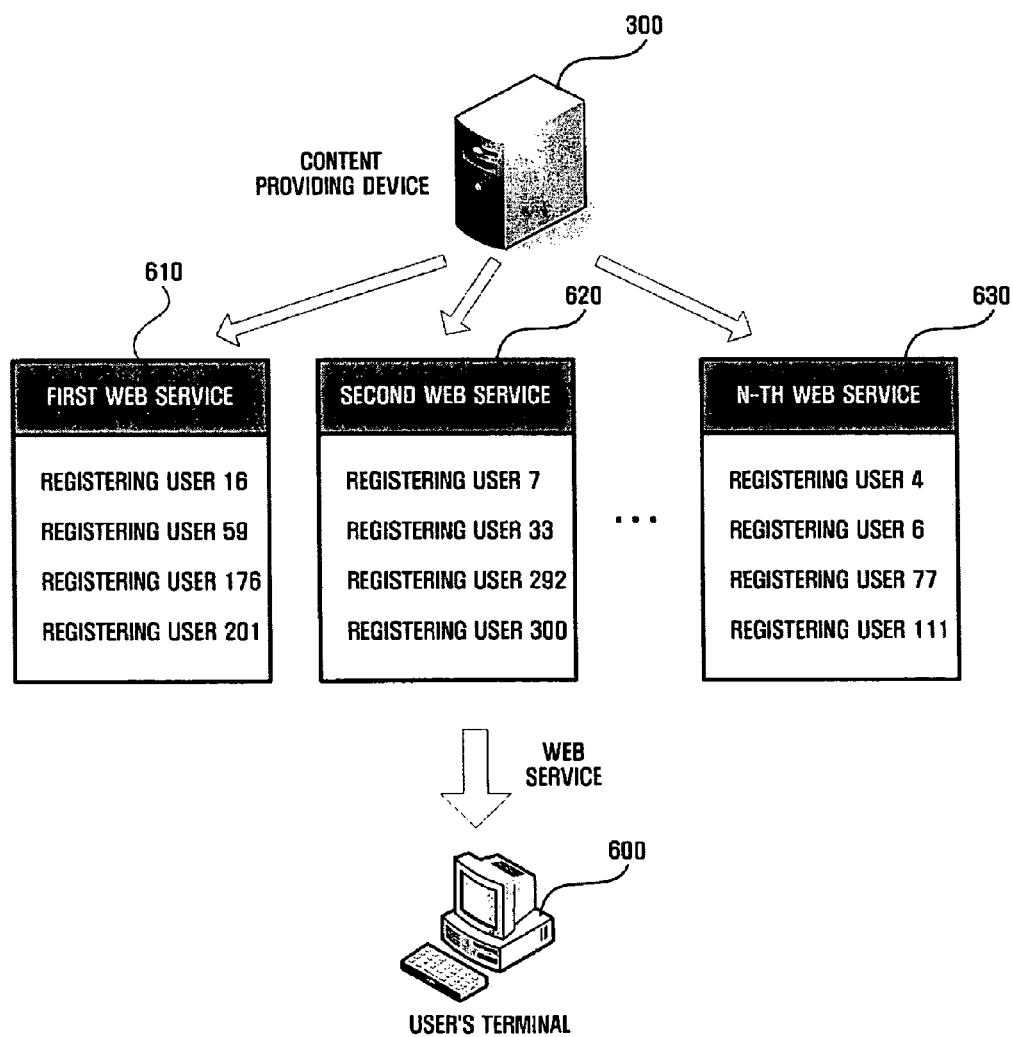
FIG. 6 is a concept view showing that a web service is provided according to an exemplary embodiment of the present invention.

FIG. 6 is a concept view showing the providing of a web service according to an exemplary embodiment of the present invention.

The group service generating unit 350 of the content providing device 360 generates web services 610, 620, and 630 having a similar mood code. The generated web services 610, 620, and 630 are transmitted to a terminal 600 of a user logged in via the sending/receiving unit 310.

The web services 610, 620, and 630, in this case, include online chatting and content sharing, but they may also include other web services. Users having a similar mood code may chat with each other online, and may share content or a content list. Here, the content sharing refers to not only a direct exchange of content but also an exchange of streaming. That is, a specific user, included in a group, may perform a streaming service using his/her content to other users.

Since web services 610, 620, and 630 are a group service provided to users having a similar mood code, if a user's mood code is changed by modifying his/her content list, the group of web services provided to the user may be also changed.

In the case where the content abstracting unit 360 of the content providing device 300 generates web services 610, 620, and 630 for an album group having a similar mood code, the generated web services 610, 620, and 630 are transmitted to a user having the corresponding album.

Since the mood code generated corresponding to an album depends on only the corresponding album (hereinafter, referred to as a first album), a change of a content list included in the user's other album (hereinafter, referred to as a second album) may not effect a change of the mood code corresponding to a first album.

That is, a user may receive a web service which is changed based on a second album by changing the content list included in the second album, and continue to receive the same web service corresponding to the first album.

Figure 7:
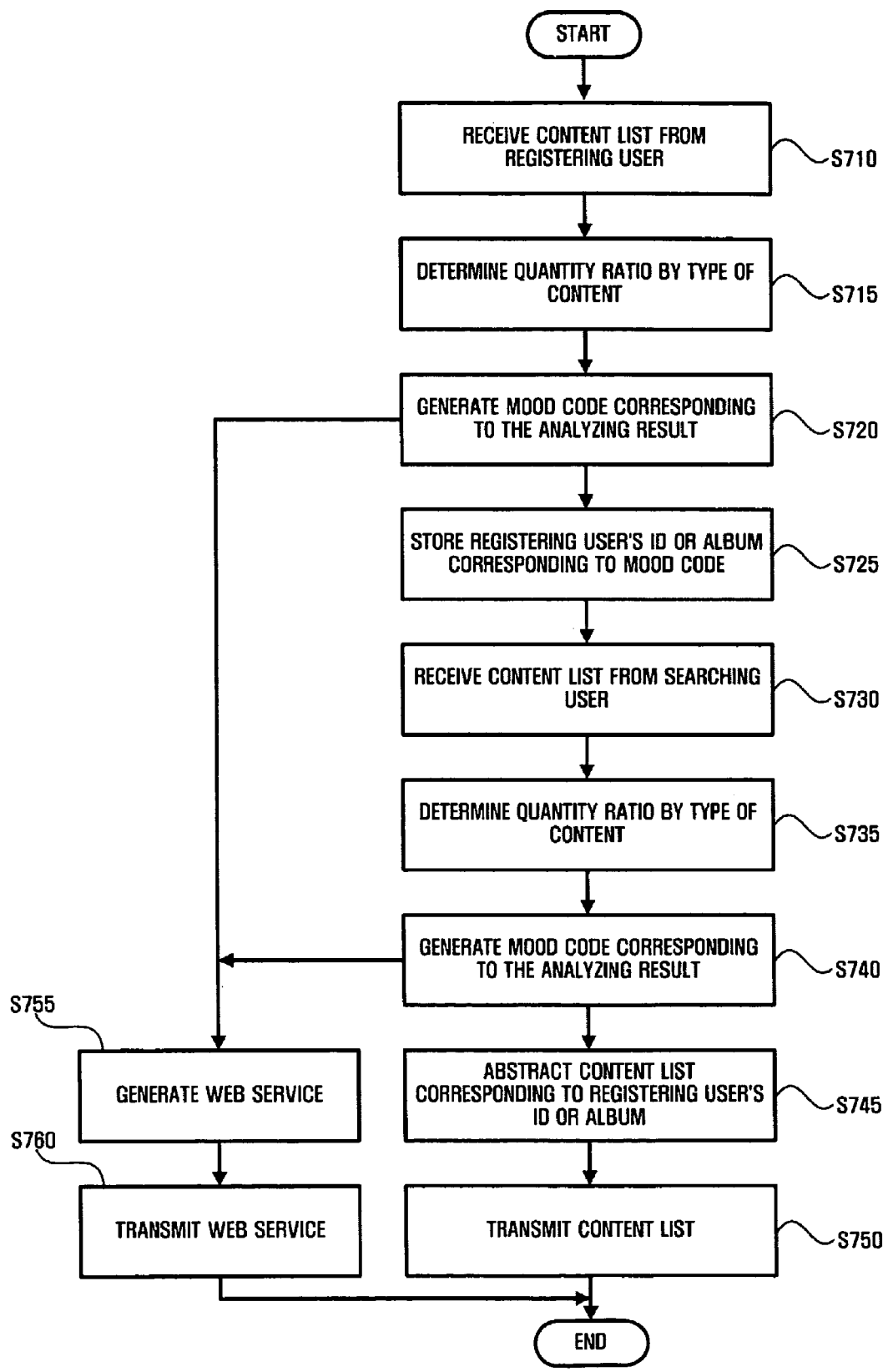
FIG. 7 is a flowchart showing the providing of multimedia contents are provided according to an exemplary embodiment of the present invention.

FIG. 7 is a flowchart showing the providing of multimedia content according to an exemplary embodiment of the present invention.

To provide multimedia content to a searching user, the sending/receiving unit 310 of the content providing device 300 receives a content list from a registering user (S710).

The received registering user's content list is transmitted to the analyzing unit 330. The analyzing unit 330 analyzes the content list to determine a quantity ratio by type of content in the content list (S715). Here, for purposes of illustration, the type includes at least one of genre, age group, time, mood, weather, situation, title, artist, and lyrics.

Also, the analyzing unit 330 may analyze the content list to determine a quantity ratio based on several types of content included in a single content list. For example, the analyzing unit 330 may determine a quantity ratio by age group of content, as well as a quantity ratio by genre of content.

The result of the analyzing unit 330 is transmitted to the mood code generating unit 340. The mood code generating unit 340 generates a mood code as a result of the quantity ratio or ratios determined by the analyzing unit 330 (S720). And, the mood code generating unit 340 stores a content list corresponding to the generated mood code in the storage unit 320; at this time, a registering user's ID or album is stored according to the mood code (S725). Since only the stored album's title may be stored, the content list included in the album may be additionally stored by logically connecting to the registering user's ID or album.

After storing a registering user's content list, the sending/receiving unit 310 receives a content list from a searching user (S730).

The received searching user's content list is transmitted to the analyzing unit 330. The analyzing unit 330 analyzes the content list to determine a quantity ratio of content types in the content list (S735).

The searching user's content list may be received via the sending/receiving unit 310, or it may be a content list that was registered in advance. If a searching user's content list was registered in advance, the analyzing unit 330 may analyze it by searching the storage unit 320 according to the searching user's login and abstracting a content list corresponding to a searching user's ID.

The analyzing unit 330 may analyze the content list to determine a ratio based on several types of contents included in a single content list; since this was described above, an explanation thereof will be omitted.

The result of the analyzing unit 330 is transmitted to the mood code generating unit 340. The mood code generating unit 340 generates a mood code corresponding to the received result (S740).

The generated mood code is transmitted to the content abstracting unit 360. The content abstracting unit 360 abstracts a registering user's ID or album corresponding to the mood code received by searching for the storage unit 320, and abstracts a content list corresponding to the registering user's ID or album (S745).

The abstracted content list is transmitted to a searching user's terminal via the sending/receiving unit 310 (S750).

The group service generating unit 350 generates a web service corresponding to the mood code as a mood code of registering or searching users is generated S755. The web service may include online chatting and multimedia content sharing. The generated web service may be transmitted to a user having the corresponding mood code via the sending/receiving unit 310 (S760).

In this regard, a registering or searching user who receives a web service may chat online, or may exchange multimedia content with another user.

As described above, the apparatus and method for providing multimedia content according to the various exemplary embodiments of present invention may produce one or more effects described below.

According to the present invention, the apparatus and method may abstract content or a content list of a similar mood code registered by a registering user by using a mood code corresponding to a quantity ratio of content input by a searching user, thereby providing desired content to a searching user.

According to another exemplary embodiment of the present invention, the apparatus and method enables management of an additional group that consists of users who have a similar mood code, thereby providing a service according to a user's preference.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for providing multimedia content, the apparatus comprising:
    an analyzing unit that determines a quantity ratio corresponding to a type of first multimedia content;
    a mood code generating unit that generates a mood code corresponding to the quantity ratio;
    a content abstracting unit that abstracts a list of second multimedia content corresponding to the generated mood code; and
    a sending unit that sends at least one of the list and the second multimedia content corresponding to the list;
    wherein said mood code indicates a specific quantity ratio by type;
    wherein said type comprises a plurality of categories; and
    wherein said quantity ratio is a ratio of each category to an entire amount of said first multimedia content.

2. The apparatus of claim 1, wherein the first multimedia content is included in an album.

3. The apparatus of claim 1, wherein the type comprises at least one of a genre, an age group, a time, a mood, weather, a situation, a title, an artist, and lyrics.

4. The apparatus of claim 3, wherein the analyzing unit determines a quantity ratio based on a plurality of types of the first multimedia content.

5. The apparatus of claim 2, wherein the mood code is provided to the album comprising the first multimedia content or a user who registers the first multimedia as the quantity ratio by the type.

6. The apparatus of claim 1, further comprising:
    a group service generating unit that forms a mood code based on the generated mood code, and generates a web service for a group.

7. The apparatus of claim 6, wherein the web service comprises at least one of online chatting and multimedia content sharing.

8. The apparatus of claim 6, wherein the sending unit sends the web service to a user who has a mood code included in the group.

9. A method of providing multimedia content, the method comprising:
    determining a quantity ratio corresponding to a type of first multimedia content;
    generating a mood code corresponding to the quantity ratio;
    abstracting a list of second multimedia content corresponding to the generated mood code; and
    sending at least one of the list and the second multimedia content corresponding to the list;
    wherein said mood code indicates a specific quantity ratio by type;
    wherein said type comprises a plurality of categories; and
    wherein said quantity ratio is a ratio of each category to an entire amount of said first multimedia content.

10. The method of claim 9, wherein the first multimedia content is included in an album.

11. The method of claim 9, wherein the type comprises at least one of a genre, an age group, a time, a mood, weather, a situation, a title, an artist, and lyrics.

12. The method of claim 11, wherein the determining comprises determining a quantity ratio based on a plurality of types of first multimedia content.

13. The method of claim 10, wherein the mood code is provided to the album comprising the first multimedia content or a user who registers the first multimedia as the quantity ratio by the type.

14. The method of claim 9, further comprising:
    forming a mood code similar to the generated mood code, and generating a web service for a group.

15. The method of claim 14, wherein the web service comprises at least one of online chatting and multimedia content sharing.

16. The method of claim 14, further comprising:
sending the web service to a user who has a mood code included in the group.

17. An apparatus for providing multimedia content, the apparatus comprising:
an analyzing unit that determines a quantity ratio corresponding to a type of first multimedia content;
a mood code generating unit that generates a mood code corresponding to the quantity ratio;
a content abstracting unit that abstracts a list of second multimedia content corresponding to the generated mood code; and
a sending unit that sends at least one of the list and the second multimedia content corresponding to the list;
wherein said mood code indicates a specific quantity ratio by type,
wherein said content abstracting unit abstracts said list of second multimedia content only when a similarity of the mood code of said first multimedia content and a mood code of said second multimedia content is greater than a minimum threshold.

18. An apparatus for providing multimedia content, the apparatus comprising:
an analyzing unit that determines a quantity ratio corresponding to a type of first multimedia content;
a mood code generating unit that generates a mood code corresponding to the quantity ratio;
a content abstracting unit that abstracts a list of second multimedia content corresponding to the generated mood code; and
a sending unit that sends at least one of the list and the second multimedia content corresponding to the list;
wherein said mood code indicates a specific quantity ratio by type;
wherein the type comprises at least one of a genre, an age group, a time, a mood, weather, a situation, a title, an artist, and lyrics;
wherein the analyzing unit determines a quantity ratio based on a plurality of types of the first multimedia content;
wherein said analyzing unit determines a quantity ratio for each of said plurality of types of the first multimedia content;
wherein said mood code generating unit generates a mood code for each determined quantity ratio, and generates an integrated mood code by integrating said generated mood codes; and
wherein said content abstracting unit abstracts a list of second multimedia content corresponding to the integrated mood code.

19. A method of providing multimedia content, the method comprising:
determining a quantity ratio corresponding to a type of first multimedia content;
generating a mood code corresponding to the quantity ratio;
abstracting a list of second multimedia content corresponding to the generated mood code; and
sending at least one of the list and the second multimedia content corresponding to the list;
wherein said mood code indicates a specific quantity ratio by type;
wherein the abstracting comprises abstracting said list of second multimedia content only when a similarity of the mood code of said first multimedia content and a mood code of said second multimedia content is greater than a minimum threshold.

20. A method of providing multimedia content, the method comprising:
determining a quantity ratio corresponding to a type of first multimedia content;
generating a mood code corresponding to the quantity ratio;
abstracting a list of second multimedia content corresponding to the generated mood code; and
sending at least one of the list and the second multimedia content corresponding to the list;
wherein said mood code indicates a specific quantity ratio by type;
wherein the type comprises at least one of a genre, an age group, a time, a mood, weather, a situation, a title, an artist, and lyrics;
wherein the determining comprises determining a quantity ratio based on a plurality of types of first multimedia content;
wherein the determining comprises determining a quantity ratio for each of said plurality of types of the first multimedia content;
wherein said mood code generating unit generates a mood code for each determined quantity ratio, and generates an integrated mood code by integrating said generated mood codes; and
wherein said content abstracting unit abstracts a list of second multimedia content corresponding to the integrated mood code.

* * * * *